July 10, 1945.  C. E. LINDEN ET AL  2,380,055
CLAMPING MECHANISM FOR MACHINE TOOLS
Filed March 3, 1944  2 Sheets-Sheet 1

INVENTOR.
Carl E. Linden
Raymond H. McClellan
BY
Wood, Arey, Herron & Evans
Attorneys.

Patented July 10, 1945

2,380,055

UNITED STATES PATENT OFFICE 2,380,055

CLAMPING MECHANISM FOR MACHINE TOOLS

Carl E. Linden, Cincinnati, and Raymond H. McClellan, Hamilton, Ohio, assignors to The Fosdick Machine Tool Company, Cincinnati, Ohio, a corporation of Ohio Application March 3, 1944, Serial No. 524,926

5 Claims. (Cl. 77—27)

This invention relates to machine tools and is directed particularly to the clamping mechanism of a radial drill through which the column is clamped against rotation on the base or stump.

In the past the clamp element whether encircling the column or the stump, as the case may be, has been split so as to be contractable and various mechanisms have been employed for drawing the sections together at opposite sides of the split to obtain the desired clamping action. However, one of the difficulties with this type of mechanism has been that the actuation of the clamp is attended by a rotative displacement or inching movement of the member being clamped. This movement, slight though it is at the point of origin, is multiplied at the tool supported on the radial arm of the machine. During normal machine operations the tool is set carefully over the hole to be drilled, then the arm or column is clamped against rotation. However, when this inching action occurs the setting of the tool is disturbed and it becomes misaligned.

This undesirable displacement or rotative movement occurs because of the fact that the split portions of the clamping element engage the mating member unevenly as the clamping operation proceeds. Gripping takes place at one point before another and, since the pressure is exerted more or less tangentially or circumferentially, one portion of the encircling clamp element frequently remains stationary while the other is pulled toward it. The clamping member therefore creeps about its support and the movement is manifest at the tool. To avoid this difficulty, when it occurs, the operator either must take the amount of creep into consideration in setting the tool or else shift the work to accommodate the movement.

The principal objective of the present invention has been to provide a clamping mechanism for a radial drill in which there is no possibility for the clamping forces to effect rotative displacement of the clamping member from its preset position. The present application is a continuation in part of our copending application Serial No. 468,212 and is predicated upon an improvement in which one member of the clamping organization comprises one or more annular surfaces extending laterally or transversely of the column or the stump of the machine, while clamp jaws are arranged to exert a pressure thereon in a direction substantially longitudinally of the column or the stump to provide thrust forces which are devoid of circumferential components. Otherwise expressed, the desired freedom from a creeping action is obtained through a structure in which the clamping pressure is exerted parallel with the column or the stump.

A further objective of this invention has been to provide a structure in which the clamping pressure is exerted through one or more pairs, the jaws of each pair being oppositely actuated with respect to one another whereby the clamping pressures they exert are balanced in direct tension or compression, and freedom from complex strains tending to cause warpage or distortion is preserved.

A still further objective of the present invention has been to provide a simple structure in which the clamping means is mounted and journalled firmly and is operative independently of any wear which the parts may suffer during usage.

Other objectives of the invention and further advantages appear in the following detailed description of the drawings in which a preferred embodiment of the improvement is illustrated.

Figure 1:
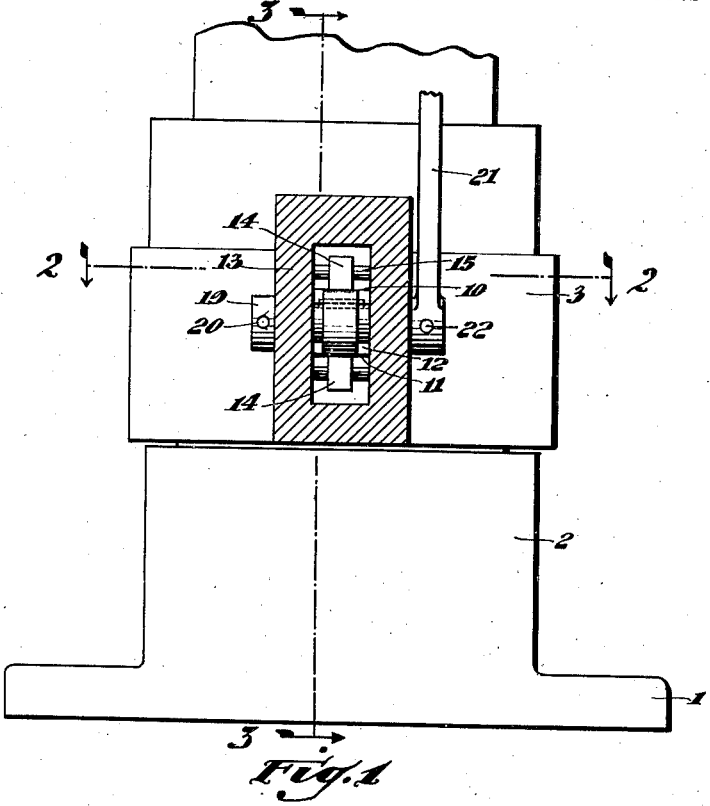
Figure 1 is an elevation of a radial drill stump incorporating the improved clamping mechanism through which the column of the machine is clamped to the base.
Figure 2:
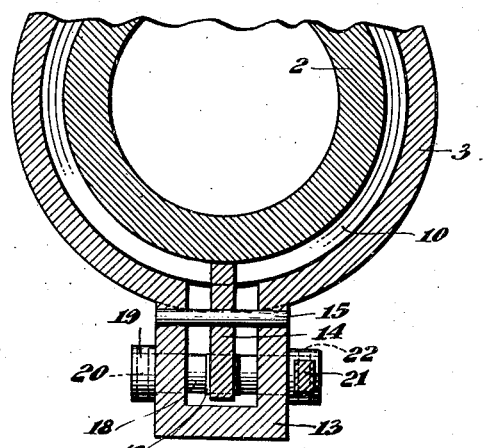
Figure 2 is a cross sectional view through the column and the stump as taken on the line 2—2 of Figure 1.
Figure 3:
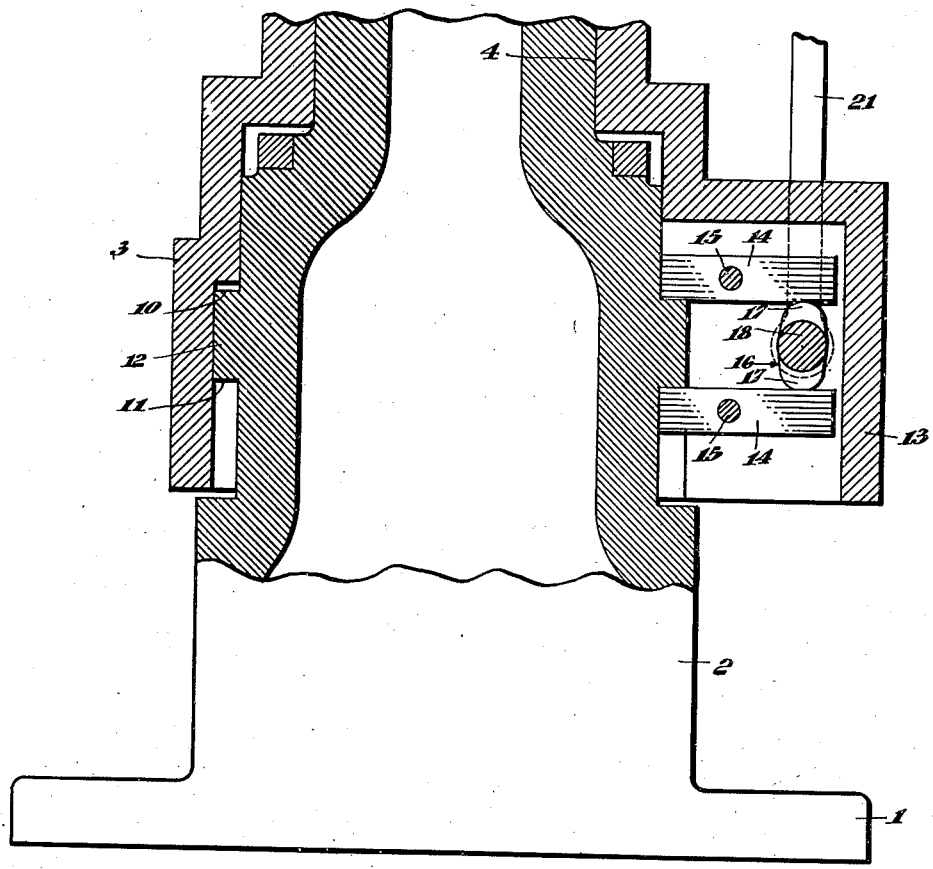
Figure 3 is a vertical sectional view taken on the line 3—3 of Figure 1 and shows further details of the clamping mechanism.

The structure illustrated in the drawings is applied at the base or stump of the machine for clamping the column thereto and the base of the radial drill is indicated generally at 1. It is of the usual type and has a turned stump 2 projecting upwardly from it. The column comprises a skirt 3 which surrounds the lower portion of the stump while the main journal of the column on the stump is provided as at 4. This structure is relatively typical in radial drill construction and of course may be varied to suit any given design.

However, in accordance with the present invention the stump is configurated to provide at least one and preferably two annular clamping surfaces, indicated at 10, 11, which extend circumferentially about the stump within the column skirt and in a direction laterally or transversely of its axis. In the preferred embodiment these surfaces are formed by an annular ring 12 which is integral with the stump and which is established by suitable counterturning of it.

At the outside of the column skirt a box or housing indicated generally at 13 is provided. This preferably is cast integrally with the column and constitutes a journal box in which clamping members are supported and concealed. The clamping members are two jaws 14—14 which are located at the opposite sides of the respective surfaces 10 and 11 of the clamp ring 12. In the structure in which only one clamp surface, e. g. 10, is utilized only one jaw, e. g. 14, is employed to act against it. However, it is to be observed that the double jaw structure is more desirable inasmuch as the jaws act one directly against the other placing only the portion of the clamp ring 12 which is therebetween directly in compression without introducing other forces in the system which would tend to misalign or distort the parts.

The jaws 14 are pivotally mounted upon studs 15—15. These extend crosswise between the side walls of the box 13 and they constitute fulcrums about which the jaws are pivotally operated. Outwardly beyond the studs 15 a cam element 16 is installed between the innermost surfaces of the jaws. This element is double faced and presents a cam surface 17 for each jaw. The cam element 16 is supported upon a rock shaft 18 which like the pivots 15 is journalled in the opposite side walls of the box 13. The rock shaft extends beyond the side walls thereof and at its one end it carries a collar 19 which is pinned thereto as at 20. At the opposite end a lever 21 is fastened to the rock shaft through a pin 22. The lever may be rotated through an arc in any suitable manner and those skilled in the art readily will comprehend various mechanisms which have been devised for this function.

In the operation of the apparatus rotation of the lever brings the pressure surfaces 17 of the cam element 18 into and out of engagement with the faces of the jaws 14 and they move pivotally upon the cross shafts 15 whereby the inner ends of the jaws move toward or from the clamping surfaces 10, 11 of the clamp ring 12. Thus, as the outer extremities of the jaws are spread apart the inner extremities are moved together to exert the desired clamping action.

By arranging the fulcrums oppositely to that shown in the drawings the inner ends of the jaws may be spread apart to exert a similar clamping pressure upon opposite surfaces of a groove cut into the stump periphery. In either event complex forces tending to cause buckling or distortion of the stump or column, such as the forces encountered in the typical split ring type of clamp, are avoided and the members are clamped firmly against movement without distortion in a vertical direction and without the tendency to creep or inch from a preset position.

Having described our invention, we claim:

1. In a radial drill having concentric inner and outer circular members, one engaging the other and adapted to be clamped together, a clamping mechanism comprising means on one of said members delineating opposed annular surfaces thereon which extend in a direction lateral to the axis of said members, and means carried by the other of said members comprising jaws pivotally mounted thereon and having surfaces at one side of their pivotal axes respectively for engaging said annular surfaces, means common to said jaws at the opposite side of the pivotal axes thereof for actuating said jaws pivotally whereby they are forced into clamping engagement with said annular surfaces.

2. In a radial drill comprising a stump, a column encircling the stump, the said stump having an annular ring thereon presenting clamping surfaces extending laterally to the stump axis, jaw means pivotally mounted on said column and presenting surfaces respectively for engaging said opposed surfaces of said annular ring, and means common to said jaw members for actuating them whereby opposed pressures are exerted upon said ring to clamp said column to said stump.

3. In a radial drill comprising a stump, a column encircling the stump, the said stump having an annular ring thereon presenting clamping surfaces extending laterally to the longitudinal axis thereof, jaw means pivotally mounted on said column and presenting surfaces respectively for engaging said opposed surfaces of said annular ring, a shaft carried by said column and passing intermediate said jaws, and means carried by said shaft for actuating said jaws pivotally toward said opposed clamping pressures on said ring.

4. In a radial drill comprising a stump, a column encircling the stump, a clamping mechanism for clamping said column to said stump comprising means on said stump presenting annular surfaces extending laterally to the longitudinal axis thereof, means on said column comprising a housing having side walls, pivot members supported in said side walls adjacent said annular surfaces, jaws rotatably supported on said pivots within said housing for clamping coaction with said annular surfaces, and cam means interposed within said housing between said jaws for rocking them about their pivotal axes and thereby causing them to exert clamping pressures on said annular surfaces.

5. In a radial drill comprising a stump, a column encircling said stump, said stump having means thereon delineating annular surfaces extending laterally to the longitudinal axis thereof, a housing having side walls spaced apart from one another and extending from said column adjacent said annular surfaces, jaw members pivotally supported within said housing for respective engagement with said annular surfaces, a shaft journalled in said housing intermediate said jaw members, said shaft having cam means common to said jaw members for actuating them, and means for rotating said shaft whereby said cam means thereon actuates the jaw members for pressure engagement thereof with said annular surfaces.

CARL E. LINDEN.
RAYMOND H. McCLELLAN.